No. 873,382.  
PATENTED DEC. 10, 1907.  
J. MARX.  
STORAGE BATTERY GRID.  
APPLICATION FILED JAN. 2, 1907.
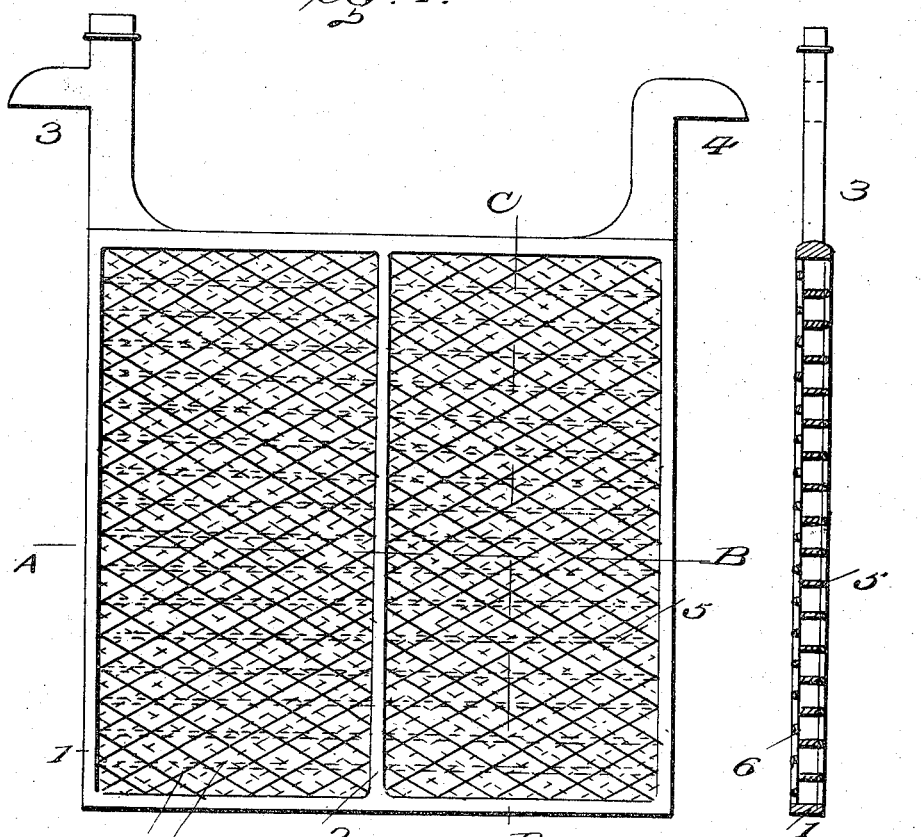
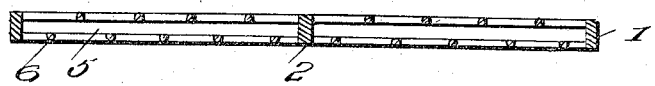
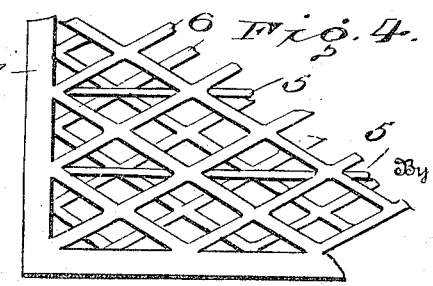
Inventor  
Joseph Marx

UNITED STATES PATENT OFFICE.

JOSEPH MARX, OF BUFFALO, NEW YORK.

STORAGE-BATTERY GRID.

No. 873,382.　　　　Specification of Letters Patent.　　　　Patented Dec. 10, 1907.

Application filed January 2, 1907. Serial No. 350,444.

*To all whom it may concern:*

Be it known that I, JOSEPH MARX, citizen of the United States, residing at Buffalo, in the county of Erie and State of New York, have invented certain new and useful Improvements in Storage-Battery Grids, of which the following is a specification.

This invention contemplates certain new and useful improvements in plates or electrodes for storage batteries, of that type in which the active element or material such as oxid of lead is packed into a grid or grated framework, and the object of my invention is a grid or plate of this character which will possess to a high degree the characteristics of durability, high conductivity and efficiency of service.

To this end, the invention consists in certain constructions and arrangements of the parts of the grid, as will be hereinafter fully described and claimed, reference being had to the accompanying drawing, in which:

Figure 1 is a face view of one embodiment of my invention; Fig. 2 is a sectional view on the line A—B of Fig. 1; Fig. 3 is a similar view on the line C—D of Fig. 1; Fig. 4 is a side elevation upon an enlarged scale of a fragment of the grid.

Corresponding and like parts are referred to in the following description and indicated in all the views of the drawings by the same reference characters.

Referring to the drawing, the numeral 1 designates the frame of my improved grid, which may be of any desired size and which may be, if desired, provided with one or more bars 2 to strengthen it. It may be composed, for example, of antimonious lead, and is designed to have packed into it the active element or material, such as oxid of lead. The frame is provided with suspending lugs 3 and 4 of any desired shape and construction. For the purpose of securing a high degree of conductivity and a maximum area of conductive points, as well as to secure durability and longevity in use, the framework, is formed with a series of shelves or bars 5 which are shown in the present instance as extending parallel to each other and horizontal with respect to the frame, as well as being spaced from each other in superposed series. The frame 1 is also formed with two sets of obliquely extending ribs 6, which are arranged on opposite sides of the series of bars 5 and which are V-shape in cross section, as shown. These bars produce gratings or diamond shaped openings, leading into the chambers formed between the bars 5.

From the foregoing description in connection with the accompanying drawings, it will be seen that when the active material is packed tightly into a frame constructed in accordance with my invention, the said material will be securely held in place and that a maximum area of conductive points will be provided. Heretofore all plates of the Faure type have been so constructed that they lose their conductive points through their discharge, owing to the shrinkage of the active material from the frame or grid. By my invention, I overcome this defect, because the active material through discharge will shrink to the bars 5 and so increase the conductivity.

Having thus described the invention, what is claimed as new is:

1. A grid of the character described, consisting of a framework provided with a series of superposed and horizontally extending bars, and obliquely extending gratings on both sides of said bars.

2. A grid of the character described, consisting of a frame provided with a series of spaced parallel and horizontally extending bars and two sets of obliquely extending ribs on opposite sides of said bars, the said ribs of each set intersecting each other, and the said ribs being V-shaped in cross section.

In testimony whereof I affix my signature in presence of two witnesses.

JOSEPH MARX. [L. S.]

Witnesses:
　J. S. HAUSSAUER,
　JNO. A. MINCHEN.